United States Patent
Takamura et al.

(10) Patent No.: US 8,660,379 B2
(45) Date of Patent: Feb. 25, 2014

(54) IMAGE PROCESSING METHOD AND COMPUTER PROGRAM

(75) Inventors: Shogo Takamura, Kyoto (JP); Hironori Yamauchi, Shiga (JP)

(73) Assignees: Rohm Co., Ltd., Kyoto (JP); Takumi Vision Co., Ltd., Shiga (JP)

( * ) Notice: Subject to any disclaimer, the term of this patent is extended or adjusted under 35 U.S.C. 154(b) by 302 days.

(21) Appl. No.: 13/141,582

(22) PCT Filed: Dec. 24, 2009

(86) PCT No.: PCT/JP2009/071496
§ 371 (c)(1),
(2), (4) Date: Jun. 22, 2011

(87) PCT Pub. No.: WO2010/074179
PCT Pub. Date: Jul. 1, 2010

(65) Prior Publication Data
US 2011/0317936 A1    Dec. 29, 2011

(30) Foreign Application Priority Data
Dec. 24, 2008 (JP) ................. 2008-328396

(51) Int. Cl.
*G06K 9/00* (2006.01)
*G06K 9/40* (2006.01)
*G06G 5/00* (2006.01)

(52) U.S. Cl.
USPC .......................... 382/274; 382/167; 345/617

(58) Field of Classification Search
USPC ............ 382/167, 168, 274; 345/617; 348/254
See application file for complete search history.

(56) References Cited

U.S. PATENT DOCUMENTS

| | | | | |
|---|---|---|---|---|
| 7,623,724 | B2 * | 11/2009 | Riccardi | 382/254 |
| 8,484,298 | B2 * | 7/2013 | Ramamoorthy et al. | 709/206 |
| 8,498,452 | B2 * | 7/2013 | Steinberg et al. | 382/118 |
| 2004/0042659 | A1 * | 3/2004 | Guo et al. | 382/176 |
| 2009/0021603 | A1 * | 1/2009 | Hsieh | 348/230.1 |
| 2009/0052774 | A1 * | 2/2009 | Yoshii et al. | 382/167 |
| 2010/0054604 | A1 * | 3/2010 | Kurokawa | 382/190 |

FOREIGN PATENT DOCUMENTS

| | | |
|---|---|---|
| JP | 63-40471 | 2/1988 |
| JP | 07-23287 | 1/1995 |
| JP | 2000-348189 | 12/2000 |

(Continued)

OTHER PUBLICATIONS

Kanazawa et al., "Computer Vision no Tameno Gazo no Tokucho Ten no Chushutsu," The Journal of the Institute of Electronics, Information and Communication Engineers, 87(12):1043-1048 (2004).

*Primary Examiner* — Yubin Hung
(74) *Attorney, Agent, or Firm* — Fish & Richardson P.C.

(57) ABSTRACT

To obtain an output image where contrast relating to the luminance of an input image has been adjusted. In an image processing method for adjusting the luminance value of each pixel contained in an input image, first, a closed region $\beta(x, y)$ made up of a plurality of pixels in the input image is demarcated as a target region, and the target region is moved within the input image by predetermined pixel units. At this point, a maximum value and a minimum value of luminance energy defined as a luminance arrangement in the target region are calculated, and difference data of the luminance energy is calculated (step S4). Next, the difference data calculated in step S4 is adapted to the input image to generate an output image (step S6).

5 Claims, 10 Drawing Sheets

(56) References Cited

FOREIGN PATENT DOCUMENTS

| JP | 2001-222722 | 8/2001 |
|----|-------------|--------|
| JP | 2002-77741  | 3/2002 |
| JP | 2002-95007  | 3/2002 |
| JP | 2002-312761 | 10/2002 |
| JP | 2006-191401 | 7/2006 |
| JP | 2006-214890 | 8/2006 |
| JP | 2007-292804 | 11/2007 |
| JP | 2008-154251 | 7/2008 |
| JP | 2008-283573 | 11/2008 |

* cited by examiner (a) LUMINANCE DISTRIBUTION BEFORE SHIFTING (b) LUMINANCE DISTRIBUTION AFTER SHIFTING $$I_1 = \frac{I_2}{2}$$

CENTER COORDINATES

CALCULATION OF MORAVEC OPERATOR VALUE
(EXTRACTION OF LUMINANCE CONCENTRATION PORTION)

$$\min \sum_{j=-r}^{r} (I_{i,j} - I_{0,0})^2 \quad i = 0, \cdots, 3$$

(a)

(b)

(c)

(a)

(b)

(c)

(a)

(b)

(c)

(d)

(e)

(f)

IMAGE PROCESSING METHOD AND COMPUTER PROGRAM

BACKGROUND OF THE INVENTION

1. Field of the Invention

The present invention relates to image processing for adjusting gradation of image data and to an image processing method for a digital image and a computer program for enhancing contrast of an input image.

2. Description of the Related Art

A contrast of a digital image is enhanced by plotting a histogram (gradation distribution) of luminance or three primary colors (RGB) included in inputted image data (referred to as an "input image") and correcting the histogram. Known histogram correction methods include equalization and extension.

It is known that, for example, a digital image having an overall whitish, foggy appearance due to excessive light quantity as a result of exposure time or the like (in the present specification, referred to as a "fog image") or a digital image conversely having an overall blackish, dark appearance due to insufficient light quantity can be adjusted to a clear image with enhanced contrast by plotting a histogram of luminance values of an input image and subjecting the histogram to equalization or extension to correct the luminance values of the input image to appropriate values (for example, refer to Japanese Patent Laid-Open No. S63-040471, Japanese Patent Laid-Open No. 2006-191401, and Japanese Patent Laid-Open No. 2007-292804).

However, an image processing method based on a histogram is problematic in that uniform averaging and extension of gradations of an input image inadvertently corrects regions whose contrast is sufficient in the first place.

In other words, when regions whose contrast is sufficient in the first place and regions whose contrast is conversely insufficient are unevenly distributed in an input image, performing uniform correction using a histogram for the entire input image may cause a pixel with high gradation to affect a region surrounding the pixel. As a result, insufficient contrasts may remain locally even after image processing, or minute but important images may become inconspicuous as a result of image processing.

The present invention has been made in consideration of the above, and an object of the present invention is to provide an image processing method and a computer program capable of adjustment to an appropriate contrast and, in particular, capable of obtaining an output image with an enhanced contour even when various contrasts are included in an input image in an uneven distribution.

SUMMARY OF THE INVENTION

An image processing method according to the present invention is an image processing method for adjusting a luminance value of each pixel contained in an input image, wherein, first, a closed region β(x, y) made up of a plurality of pixels in the input image is demarcated as a target region, and the target region is moved within the input image by predetermined pixel units. At this point, a maximum value and a minimum value of luminance energy defined as a luminance arrangement in the target region are respectively calculated, and difference data of the luminance energy is calculated (step S4). Next, the difference data calculated in step S4 is adapted to the input image to generate an output image (step S6).

The image processing methods according to the present invention can all be realized by a computer program to be executed by a computer. In addition, the computer and the program described above can be mounted to devices for displaying digital images such as a digital camera and a digital television.

With the image processing methods according to the present invention, even when various contrasts are included in an input image in an uneven distribution, the contrasts can be adjusted to appropriate contrasts and, in particular, an output image with an enhanced contour can be obtained. In addition, even when selectively executing a part of the respective steps, certain effects corresponding to an input image can be obtained. Other details will be described in the following embodiments.

DETAILED DESCRIPTION OF THE PREFERRED EMBODIMENTS

First Embodiment

Adaptive Contrast Filtering

Figure 1:
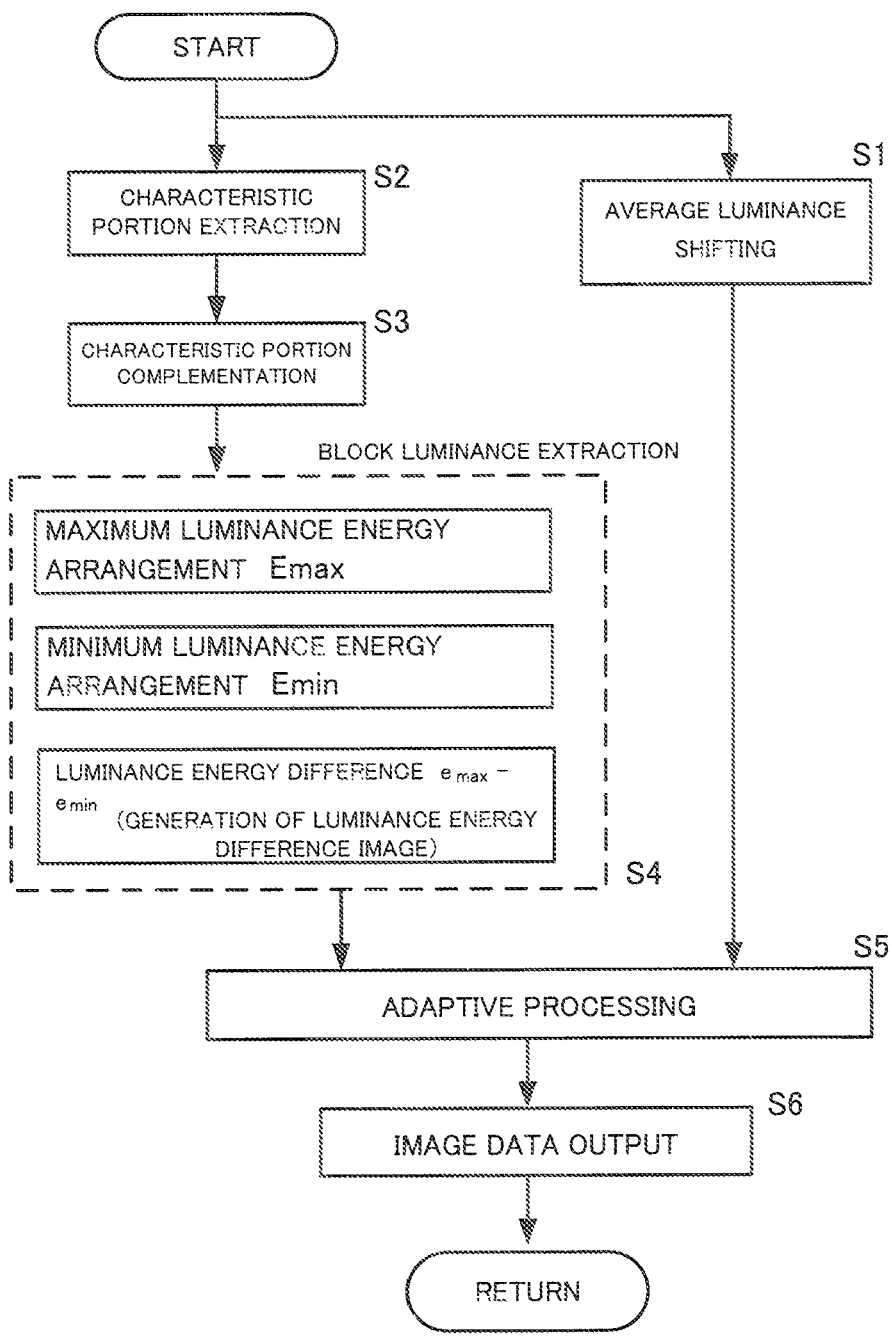
FIG. 1 is a flow chart illustrating a processing flow when having a computer execute respective steps.

FIG. 1 is a flow chart illustrating a processing flow when having a computer execute the respective steps. Hereinafter, in the present specification, the series of image processing will be referred as "adaptive contrast filtering". A feature of the image processing method according to the present invention is that a characteristic point relating to luminance included in a digital image is extracted and a predetermined computation is performed, and a preferred embodiment is made up of the following six main steps:

S1. Average luminance shifting
S2. Characteristic portion extraction
S3. Characteristic portion complementation
S4. Block luminance extraction
S5. Adaptive processing
S6. Image data output The steps S1 to S6 listed above are executed on a computer or on computers mounted to various digital image devices such as a digital camera.

An example to be described in a first embodiment is made up of the following plurality of mutually-independent elements (I) to (III).

(I) A basic step of the present invention relating to block luminance extraction based on step S4.

(II) A step for scaling luminance in an appropriate range based on steps S1 and S5 (average luminance shifting and linear transform).

(III) A step for extraction, removal, and complementation of a characteristic point for extracting sharp point-like luminance variations based on steps S2 and S3 (characteristic portion extraction/removal and complementation).

While details of the respective steps will be described later, a most important part of a technical idea of the present invention is that, in step S4, a minimum luminance energy arrangement and a maximum luminance energy arrangement in a target region are separately calculated to generate a luminance energy difference image data in the next step S5 and, in step S6, image data is ultimately outputted. Other steps (S1 and S2 to S3) are positioned as supplementary steps for further enhancing image processing accuracy.

By performing computations as described above, a digital having an overall higher contrast than an input image can be obtained without removing minute but important images.

S1. Average Luminance Shifting

In a first step, a distribution of mean luminance values of an entire input image is calculated and, subsequently, the calculated mean luminance values are shifted in parallel so that a luminance distribution waveform remains unchanged. The step is performed as an initializing process for performing adaptive contrast filtering. Luminance values are shifted (shifted in parallel) as a whole so as to assume a mean value of luminance amplitudes in order to sufficiently increase a contrast of a region included in the input image where a variation in luminance distribution is small. This step can be omitted depending on the input image.

Figure 2:
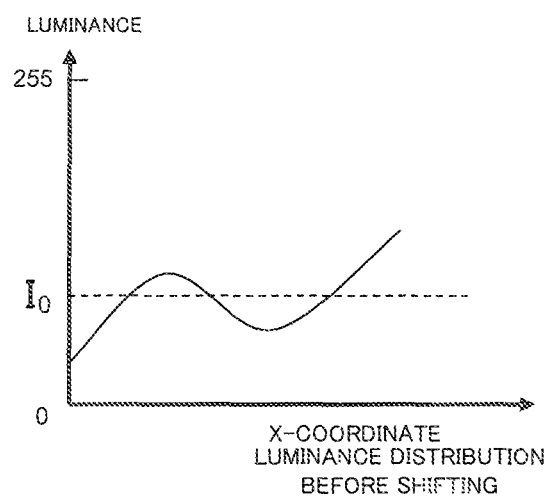
FIG. 2(a) illustrates a distribution (x-coordinates with fixed y-coordinates) of mean luminance values of an entire input image.
FIG. 2(b) illustrates a situation in which a parallel shift has been performed such that a luminance value is set to $I_2$ (=512) and a luminance average becomes equal to $I_1$ (=256)
Figure 2:
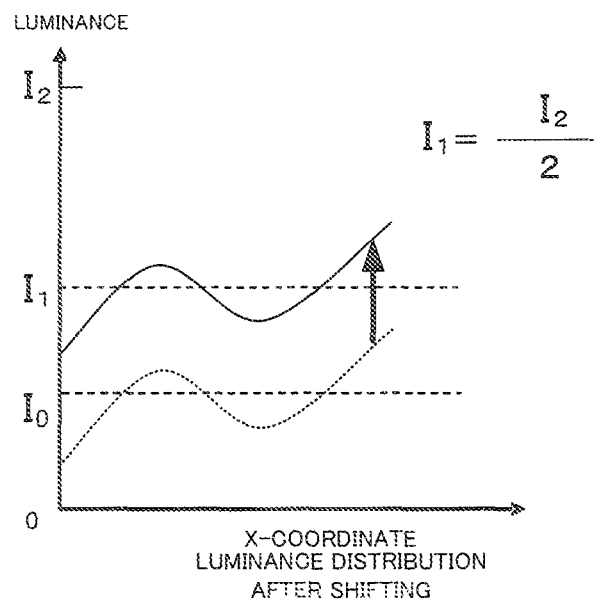

FIG. 2(a) represents a distribution (x-coordinates with fixed y-coordinates) of mean luminance values of an entire input image. Since a gradation of a luminance value has 256 levels (0 to 255) in a case of 8 bits, a luminance value of an input image has a maximum value of 255. A mean luminance in this case is denoted as $I_0$.

FIG. 2(b) illustrates a situation in which a parallel shift has been performed so that a luminance distribution waveform remains unchanged by calculating a mean luminance value of the entire input image and adding a luminance value of a specific amount determined based on the mean luminance value and a maximum luminance value after the linear transform in step to be described later (S5) to a luminance distribution of the input image or, in other words, by setting a maximum value of a range of luminance values to $I_2$ (=512) and setting a luminance average $I_1$ so as to equal ½ of the maximum value $I_2$ (=256).

This is based on a requirement that luminance values after linear transform must fall within a range of 0 to 255. In other words, a maximum value of luminance values on a coordinate axis is denoted by $I_2$. The maximum value $I_2$ must be set to a "safe" value such that when the maximum value $I_2$ is shifted in parallel to match the luminance distribution mean value $I_1=I_2/2$, a range of the luminance value does not fall below 0 or exceed $I_2$. In the case of 8-bit luminance gradation, a safest value of $I_2$ is 256×2=512. A greater value results in a carry or the like and causes problems such as a decrease in processing speed or an inability to produce an appropriate output image.

S2. Characteristic Portion Extraction

The present step S2 and a following step S3 are steps for extracting and removing, in advance, a portion in the input image where pixels with high gradation are concentrated in a small region as a characteristic portion, and complementing removed coordinates with a mean luminance of the input image since luminance at the removed coordinates become 0.

In the adaptive processing step (S5) to be described later, linear transform is applied to luminance values in order to increase luminance variation. Therefore, when a region having a concentration of high luminance such as a light source or the sun (hereinafter, referred to as a "high luminance concentration region") exists in the input image, luminance of a low luminance region surrounding the high luminance concentration region increases on average due to the influence of the pixels in the high luminance concentration region. As a result, a contrast of a dark portion with a small luminance variation is hardly enhanced and may remain blackish and virtually unchanged even after image processing, or a minute but important image nearby the high luminance concentration region may become inconspicuous as a result of image processing. In order to avoid such problems, in the present invention, processing is performed so as to extract a characteristic portion where luminance is concentrated from an input image in advance and to remove the portion.

In an experiment conducted by the present inventors, a "Moravec operator" that is known as a computing method for extracting characteristic points was used for extracting a characteristic portion. Unlike so-called "edge processing", a feature of a Moravec operator is that characteristics such as an intersection of lines are strongly extracted.

Figure 3:
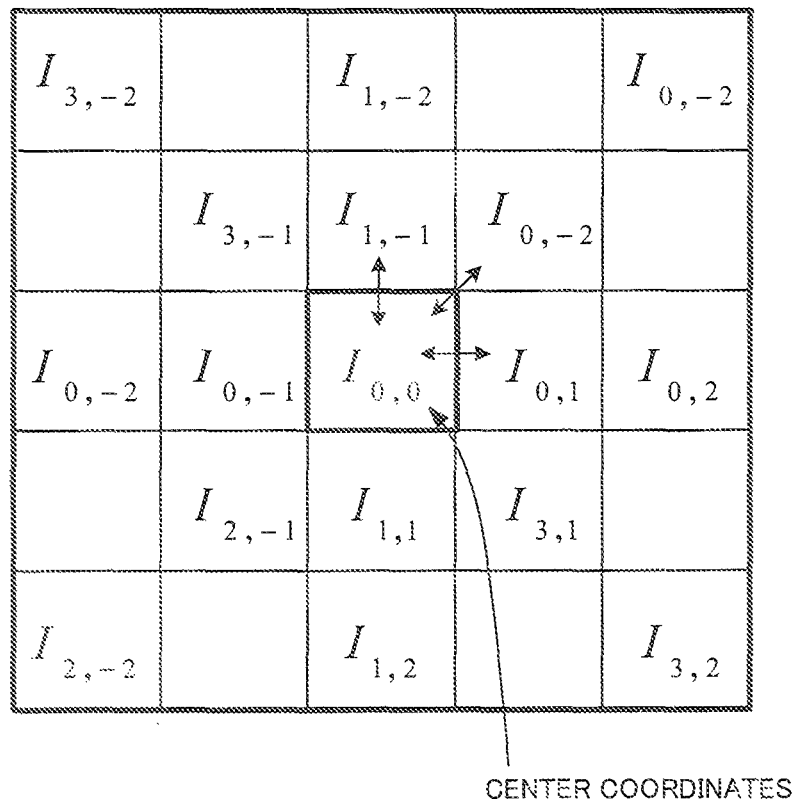
FIG. 3 is a diagram describing a "Moravec operator"

FIG. 3 is a diagram describing a computing procedure of a "Moravec operator". A table (window) illustrated in the diagram represents a closed region β (x, y) made up of a plurality of pixels to become a target region. As illustrated in FIG. 3, a center of the target region is expressed as $I_{0,0}$, the inside of a square block with $I_{0,0}$ as center is set as the target region, and luminance values of pixels in the target region are expressed as scalar quantities (in the case of 8 bits, 0 to 255). While the size of the target region can be arbitrarily set, the larger the size, the stronger the influence of the input image, and a smoother image is obtained.

An operational expression of a Moravec operator is expressed by (Expression 1) below.

$$\min \sum_{j=-r}^{r} (I_{i,j} - I_{0,0})^2 \quad i = 0, \ldots, 3 \qquad \text{[Expression 1]}$$

The operator is made up of two steps. In a first step, with respect to four directions of up-down, left-right, and diagonal in a window, a sum of squares of a difference between a value of a pixel in each direction and the central pixel $I_{0,0}$ in the window is calculated. Subsequently, a minimum value is selected from the four values. This window processing is applied to the entire image. In a second step, a local maximum value is selected from the image outputted in the first step and is eventually assumed to be an output of the operator. This computed value is a value reflecting a characteristic portion or, in the present application example, a magnitude relation of differences in luminance values, and is a scalar quantity referred to as a "Moravec operator value".

S3. Characteristic Portion Complementation

In order to improve adaptive processing accuracy, only pixels with high luminance and high degree of concentration must be removed. However, with a Moravec operator value, since a luminance difference has a proportional relationship with an output value, there is a risk that even important characteristic portions such as a point with a minute area and a large luminance difference are inadvertently extracted and removed. Therefore, removing only pixels with both high luminance and high degree of concentration is considered. In the present invention, a value proportional not only to a degree of concentration but also to luminance is obtained through calculation. Hereinafter, a value obtained in this manner is to be defined as a "degree of luminance concentration of a pixel". An operational expression for a degree of luminance concentration of a pixel is a product of a Moravec operator value and a luminance value and is expressed by (Expression 2) below.

[Degree of luminance concentration of pixel] = [Expression 2]
$$\left( \min \sum_{j=-r}^{r} (I_{i,j} - I_{0,0})^2 \right) \times I_{0,0}$$
$i = 0, \ldots, 3$ In addition, a threshold is provided for the value of the degree of luminance concentration, whereby pixels equal to or greater than the threshold are removed and complemented by $I_1$ that is a mean value of luminance distribution. Through this operation, luminance of a low luminance region surrounding a high luminance concentration region can be prevented from increasing on average due to the influence of the pixels in the high luminance concentration region without removing minute regions with large luminance differences.

S4. Block Luminance Extraction

Figure 4:
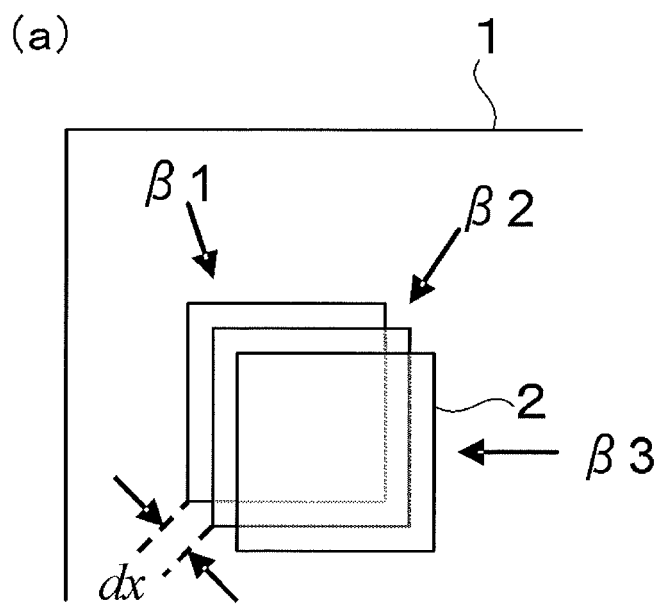
FIG. 4(a) represents a target region 2 which is arbitrarily demarcated in an input image 1.
FIG. 4(b) represents a luminance value arrangement inside a closed region β1 fixed at an arbitrarily defined position.
FIG. 4(c) represents a luminance value arrangement inside a closed region β1 fixed at an arbitrarily defined position.
Figure 4:
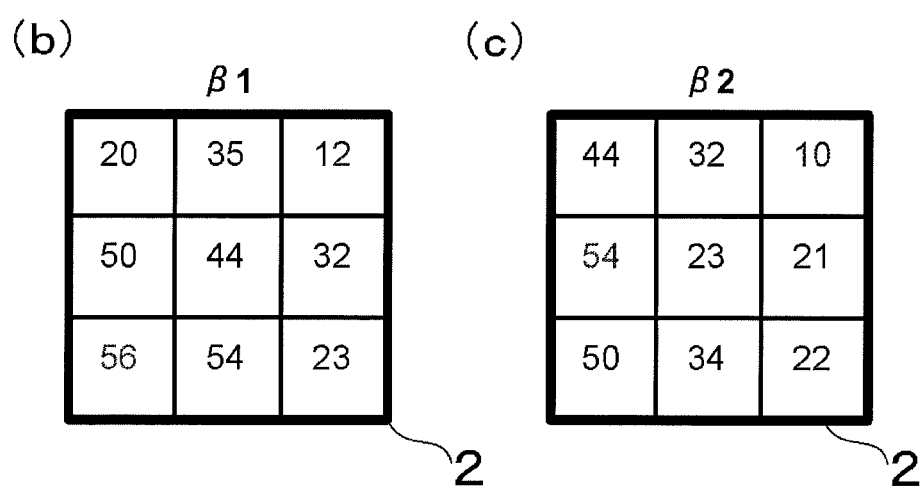

FIG. 4(a) represents a target region 2 which is arbitrarily demarcated in an input image 1. The target region 2 is a closed region $\beta(x, y)$ made up of a plurality of pixels, and a size of the target region 2 can be arbitrarily set within the input image.

FIG. 4(b) represents a luminance value arrangement inside a closed region $\beta1$ fixed at an arbitrarily defined position. The arrangement shows that, in the closed region $\beta1$, a highest luminance value is 56 and a lowest luminance value is 12. Next, in a state where y is fixed, the target region 2 is moved in an x-direction by and arbitrarily defined number of pixels. At this point, the target region 2 is moved so as to create as much overlapping as possible. For example, if $\beta2$ denotes a closed region moved in the x-direction by 1 pixel, FIG. 4(c) illustrates a luminance value arrangement inside the closed region $\beta2$. $\beta2$ may be expressed in coordinates as (x+dx, y) with respect to $\beta1$ (x, y). Moreover, while a movement is illustrated in FIGS. 4(b) and 4(c) as though performed in an obliquely downward direction, the illustration is merely for the sake of simplicity and since y is fixed, the illustrated direction may be ignored. The arrangement of the closed region $\beta2$ shows that, in the closed region $\beta2$, a highest luminance value is 54 and a lowest luminance value is 10.

Subsequently, values of maximum luminance energy and minimum energy in the target region 2 are added every time the target region 2 is moved, and a sum is finally divided by the number of movements. A value obtained in this manner is defined as "luminance energy".

Figure 5:
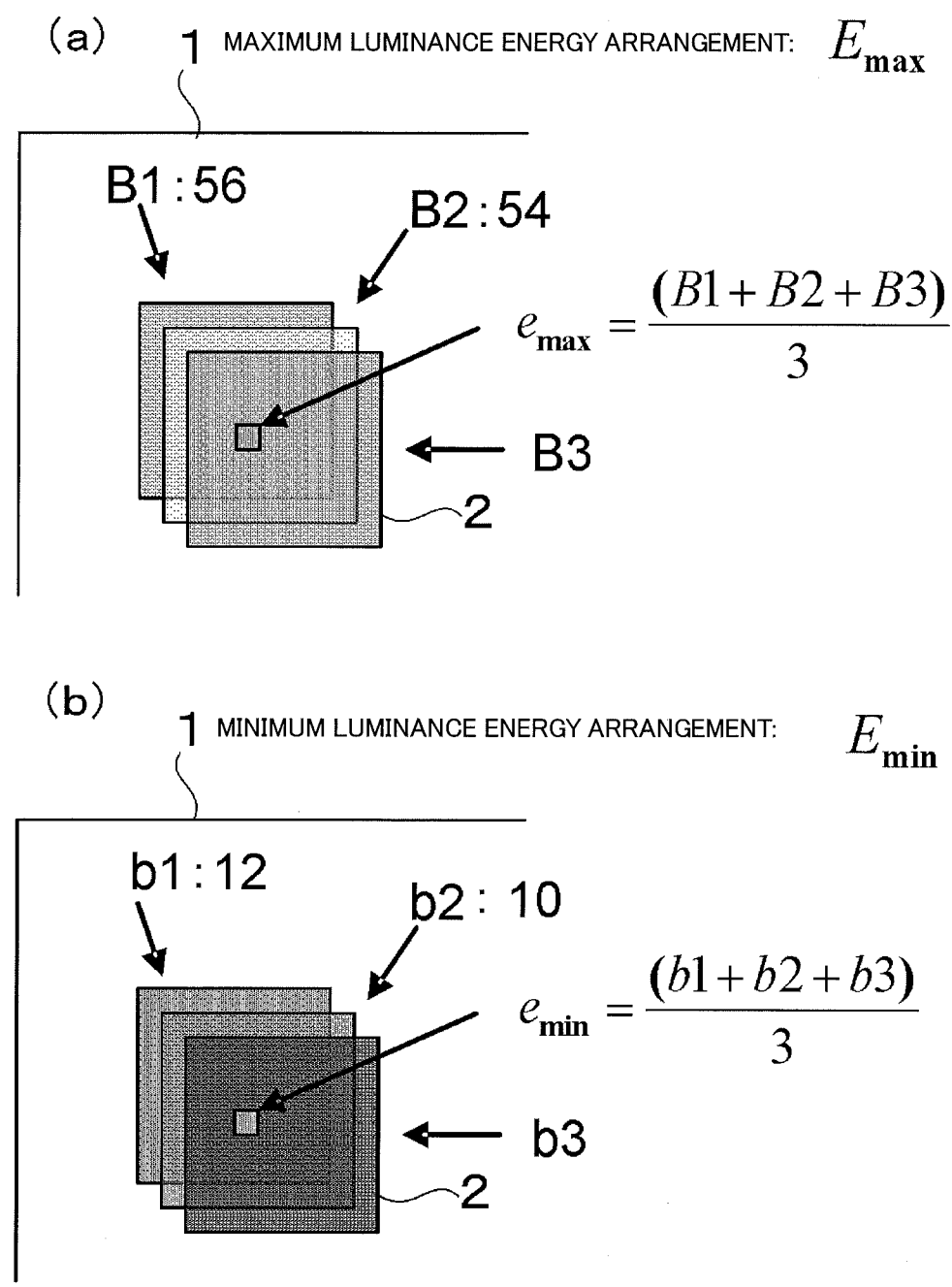
FIGS. 5(a) and 5(b) are diagrams illustrating examples of a maximum luminance energy arrangement $E_{max}$ and a minimum luminance energy arrangement $E_{min}$.

FIGS. 5(a) and 5(b) illustrate examples of a maximum luminance energy arrangement $E_{max}$ and a minimum luminance energy arrangement $E_{min}$. A case where the number of movements is 3 ($\beta1$ to $\beta3$) may be expressed as a maximum luminance energy arrangement $E_{max}=\{B1, B2, B3\}$ and a minimum luminance energy arrangement $E_{min}=\{b1, b2, b3\}$, and maximum luminance energy $e_{max}=\{B1+B2+B3\}/3$, minimum luminance energy $e_{min}=\{b1+b2+b3\}/3$ can be obtained. In addition, difference data of luminance energy can be expressed by (Expression 3) below.

$$e_{diff}=e_{max}-e_{min}$$ [Expression 3]

Moreover, while a case is being described where the number of movements is 3, in reality, the number of movements becomes huge depending on the target region and the movement pixel unit. However, the size of the target region 2 and the movement pixel unit can be appropriately set according to the purpose of image processing and contents of the input image. Conceivably, the larger the target region and the smaller the movement pixel unit, the greater the amount of calculation but the higher the accuracy of block luminance extraction.

Since a target region has a certain spread, when the movement pixel unit is small, luminance values are counted in double during calculation of luminance energy. However, this is a very important point in terms of increasing accuracy. In addition, while a case of fixing y and moving x has been described for the sake of convenience, in reality, any movement may be used.

Next, with respect to the obtained maximum luminance energy arrangement $E_{max}$ and the minimum luminance energy arrangement $E_{min}$, a difference $E_{diff}=E_{max}-E_{min}$ is calculated. Since this value is a differentiated contrast width, a contrast width of a given pixel can be obtained. Consequently, adaptive contrast expansion is performed for each pixel in a next step S5 in a region shifted in the average luminance shifting in step S-1.

S5. Linear Transform

Figure 6:
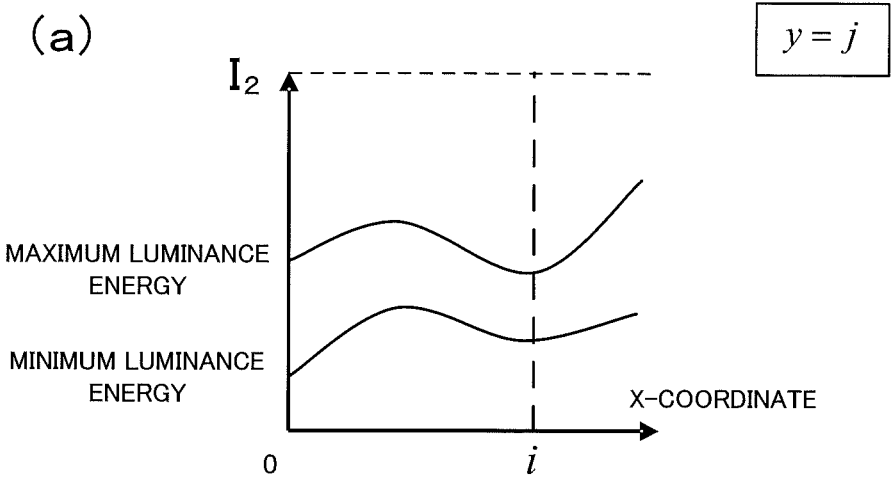
FIG. 6(a) is a diagram illustrating distributions of maximum luminance energy and minimum energy when an (x, y) coordinate in an input image is fixed such that y=j.
FIG. 6(b) is a diagram illustrating details of an adaptive processing step S5.
Figure 6:
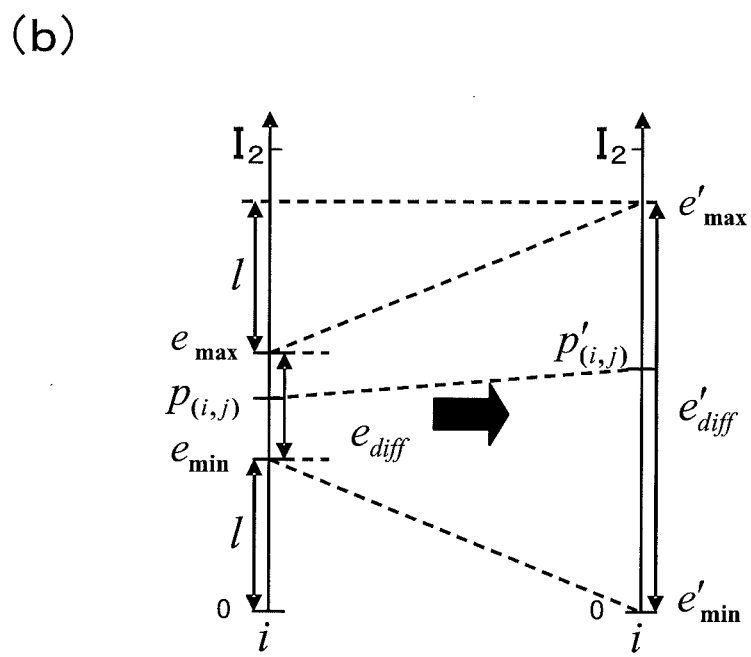

FIG. 6(a) illustrates distributions of maximum luminance energy and minimum energy when an (x, y) coordinate in an input image is fixed such that y=j. A difference between maximum luminance energy and minimum luminance energy at an arbitrarily defined x-coordinate i is calculated according to (Expression 3) described above.

The adaptive processing step of S5 is a process for enhancing contrast by performing a linear transform or, in other words, by linearly expanding a luminance difference. Details of the adaptive processing step S5 are as follows.

S5-1: For an arbitrarily defined pixel, a width of 0 to $e_{min}$ and a width of $e_{max}$ to $I_2$ are compared, whereby a value of whichever width is smaller is denoted by L. In other words, $$L=\min(I_2-e_{max}, e_{min})$$

is defined.

S5-2: Assuming that $e'_{max}=e_{max}+L$, $e'_{min}=e_{min}-L$, and $e'_{diff}=e'_{max}-e'_{min}$, a luminance value p(i,j) on a shifted pixel is linearly transformed such that $e_{min}$ to $e_{max}$ are transformed to $e'_{min}$ to $e'_{max}$. The transformed value is denoted by p'(i, j).

S5-3: (S5-1) to (S5-2) are applied to all pixels.

S5-4: A maximum value and a minimum value of the transformed values are obtained and, in the case of 8 bits, linear transform is performed such that the maximum value and the minimum value fall within a range of 0 to 255. The linear transform at this point is expressed as a linear function expression (Expression 4) below.

$$p'_{(i,j)} = \frac{e'_{diff} \times (p_{(i,j)} - e_{min})}{e_{diff}} \quad \text{[Expression 4]}$$

FIG. 6(b) illustrates the steps S5-1 to S5-4 described above. However, p(i, j) represents a luminance value on (y, x)=(i, j) after step S1 (average luminance shifting), and p'(i, j) represents a luminance value on (y, x)=(i, j) after step S5 (adaptive processing).

As already described, upon linear transform, since an extension upper limit (a maximum value $I_2$ of a possible range of luminance values after linear transform) is set in the previous step S1, luminance values after the adaptive processing are distributed within a optimum range ($e'_{min}$ to $e'_{max}$).

S6. Image Data Output by Adaptive Processing

As illustrated in the overall flow chart in FIG. 1, by adapting a luminance energy difference image data to each pixel with respect to an input image subjected to average luminance shifting in step S1, an output image is eventually obtained. The step (S6) is image data output by adaptive processing. That is, output a luminance value after the step (S5) for applying a linear transform based on a luminance energy difference image data.

Modification of First Embodiment

In the first embodiment, a case of executing all elements of (I) to (III) described above (in other words, all of steps (S1 to S6)) has been described as a most preferred embodiment. However, depending on an input image or a desired output image, as long as step S4 (S5 and S6) that are essential steps are included, only a part of the other steps may be executed as shown in (1) to (3) below.
(1) Step S4→S5→S6 (first modification)
(2) Step S1→S4→S5→S6 (second modification)
(3) Step S2→S3→S4→S5→S6 (third modification)

First Modification

Step S4→S5→S6

The first modification is a case where only the step S4 for block luminance extraction described in the first embodiment is executed on an input image. When an image such as a fog image in which a sharp difference in luminance does not exist or, in other words, an image with a uniform contrast width is used as an input image, highly practical image processing can be achieved by merely executing step S4.

Figure 10:
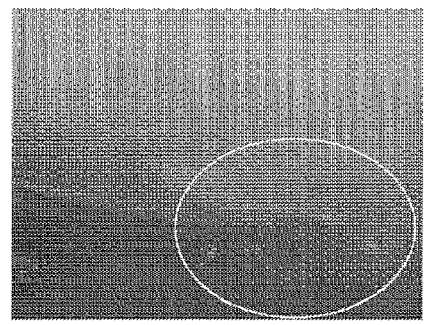
FIGS. 10(a), 10(c), and 10(e) illustrate other examples of input images.
FIGS. 10(b), 10(d), and 10(f) illustrate output images representing respective results of implementing modifications (first to third) of the first embodiment.
Figure 10:
Figure 10:
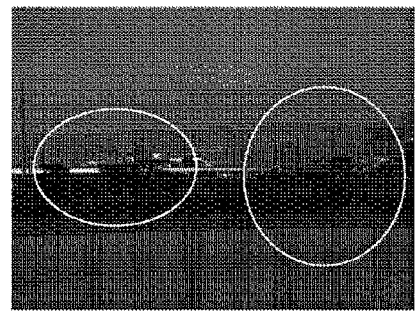
Figure 10:
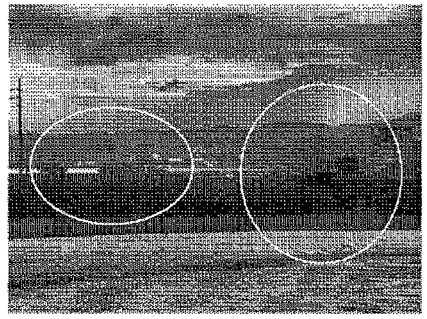
Figure 10:
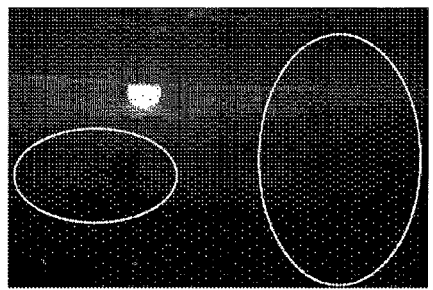
Figure 10:
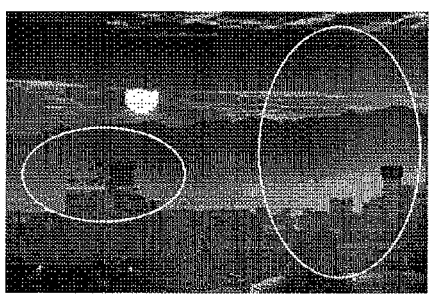

FIG. 10(a) illustrates an example of an input image, and FIG. 10(b) illustrates an output image obtained by executing steps S4, S5 and S6 on the input image. In both images, a portion in which characteristic differences appear is indicated enclosed by a frame. With the input image, since the entire image is whitish and has a small luminance difference, a contour of a subject can hardly be distinguished to make out what is portrayed in the image. By performing step S4 (block luminance extraction) described in the first embodiment on such an image, a high contrast distribution image such as that illustrated in FIG. 10(b) can be obtained.

Second Modification

Step S1→S4→S5→S6

The second modification is a case where the step S4 for block luminance extraction and the steps S1 and S5 for average luminance shifting and linear transform described in the first embodiment are executed on an input image. In this case, a similar effect as the first modification can be produced when an image such as a fog image in which a sharp difference in luminance does not exist or, in other words, an image with a uniform contrast width is used as an input image. With the second modification, when a contrast width of an input image is uniform, since a contrast width of an output image is adjusted to an appropriate range, a white-out or a black-out in the output image can be prevented.

FIG. 10(c) illustrates an example of an input image, and FIG. 10(d) illustrates an output image obtained by executing steps S1, S4, S5, and S6 on the input image. In both images, portions in which characteristic differences appear are indicated enclosed by a frame. With the input image, since the entire image is whitish and has a small luminance difference, a contour of a subject can hardly be distinguished to make out what is portrayed in the image. However, by performing the processing described above, a high contrast distribution image such as that illustrated in FIG. 10(d) can be obtained.

Third Modification

Step S2→S3→S4→S5→S6

The third modification is a case where the steps S2 and S3 for performing characteristic portion extraction/removal and complementation are executed on an input image as preprocessing of the step S4 for block luminance extraction described in the first embodiment. In this case, contrast width can be adjusted to an appropriate range for an image in which a sharp luminance difference exists such as a case where point-like lights with high luminance are present in a dark region.

FIG. 10(e) illustrates an example of an input image, and FIG. 10(f) illustrates an output image obtained by executing steps S2, S3, S4, S5 and S6 on the input image. In both images, portions in which characteristic differences appear are indicated enclosed by a frame. While the input image has a high luminance concentration region within the entire image, since luminance adjustment in other portions is inappropriate, the other portions are displayed blackish and contours of subjects can hardly be distinguished to make out what is portrayed in the image. However, by performing the processing described above, contrast distribution can be appropriately widened even when point-like lights with high luminance or the like are present in a dark region as illustrated in FIG. 10(f).

Second Embodiment

A second embodiment represents a mode for providing a computer program for realizing the image processing method according to the present invention as an image processing application program to be executed on a computer such as a personal computer.

Figure 7:
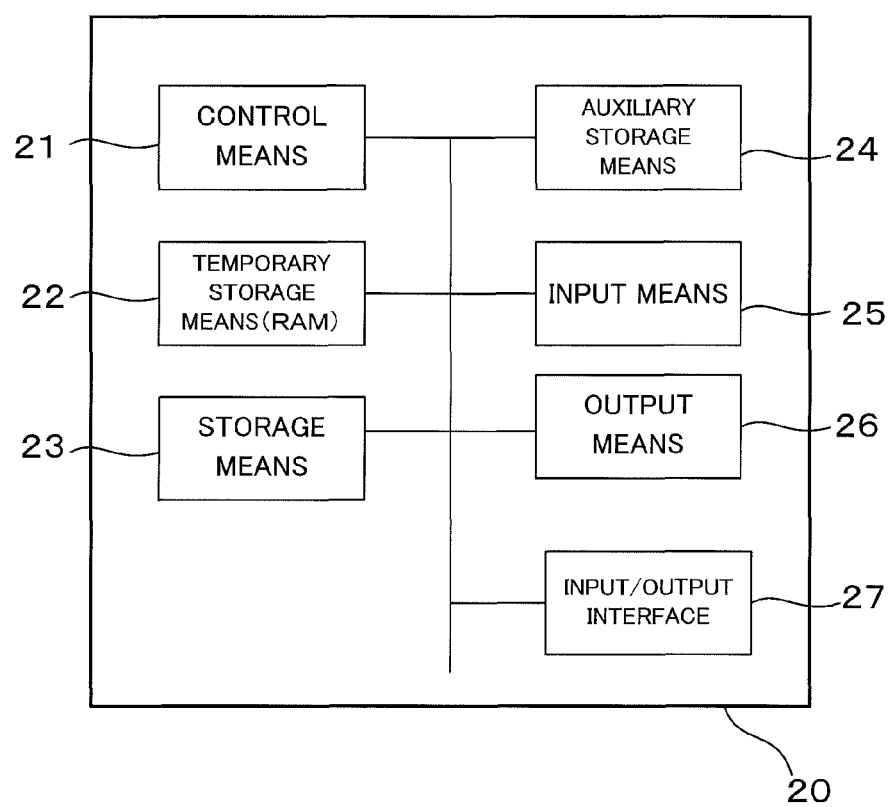
FIG. 7 is a block diagram illustrating a configuration of an image processing apparatus according to a second embodiment of the present invention.

FIG. 7 is a block diagram illustrating a configuration of an image processing apparatus according to the second embodiment of the present invention. An image processing apparatus 20 in which is installed a program for causing a personal computer to execute the respective steps of the respective image processing methods according to the present invention includes a CPU (Central Processing Unit) 21 for controlling the entire apparatus, temporary storage means 22 such as a RAM (Random Access Memory), storage means 23 such as a hard disk, auxiliary storage means 24 such as an optical disk drive for reading various data from a storage medium, input means 25 such as a mouse and a keyboard, and output means 26 such as a monitor or a printer. By loading the computer program according to the present invention recorded on a storage medium onto the storage means 23 and executing the computer program on an operating system under the control of the control means 21, the personal computer operates as the image processing apparatus 20 according to the present invention.

In the image processing apparatus 20, by executing the computer program stored in the storage means 22 under the control of the control means 21 to perform the respective steps described in the first embodiment (or modifications of the first embodiment), image processing is performed on an image stored in the storage means 23 or the like or an image inputted via an interface 27 to the outside and an output image is outputted from the output means 26.

Figure 8:
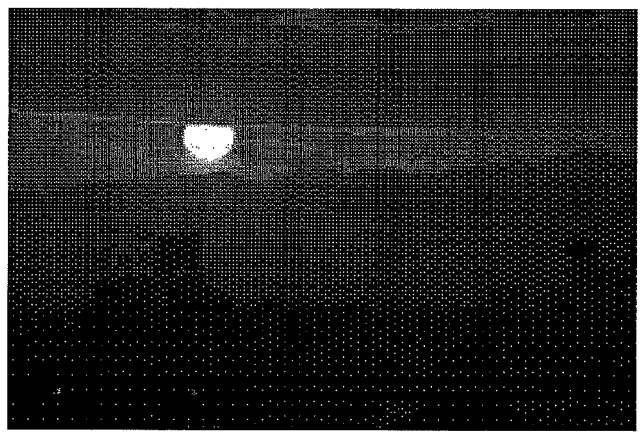
FIG. 8(a) illustrates an example of an input image.
FIG. 8(b) illustrates an output image (comparative example) representing a result of performing histogram equalization processing.
FIG. 8(c) illustrates an output image to which an image processing method according to the present invention has been applied.
Figure 8:
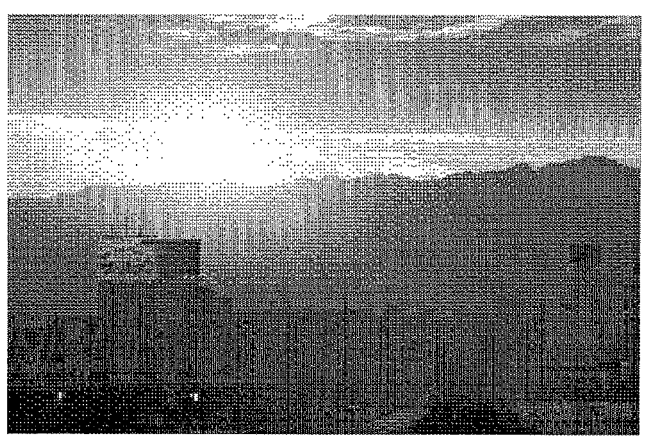
Figure 8:
Figure 9:
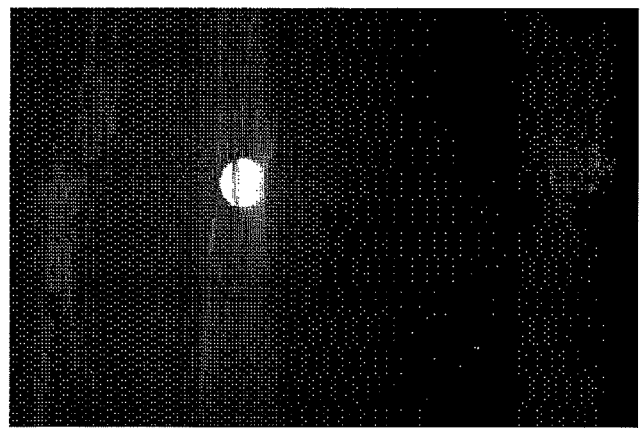
FIG. 9(a) illustrates another example of an input image.
FIG. 9(b) illustrates an output image (comparative example) representing a result of performing histogram equalization processing.
FIG. 9(c) illustrates an output image to which an image processing method according to the present invention has been applied.
Figure 9:
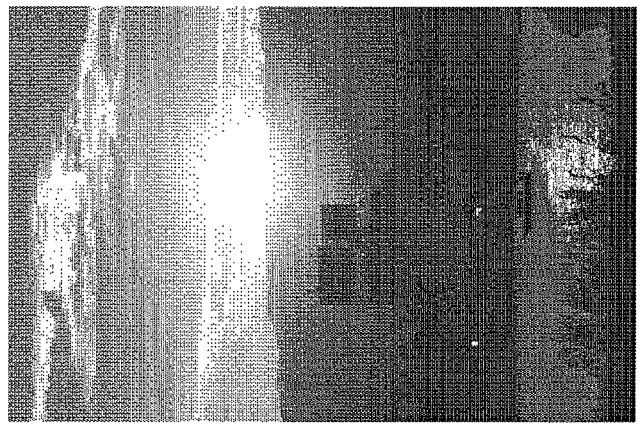
Figure 9:
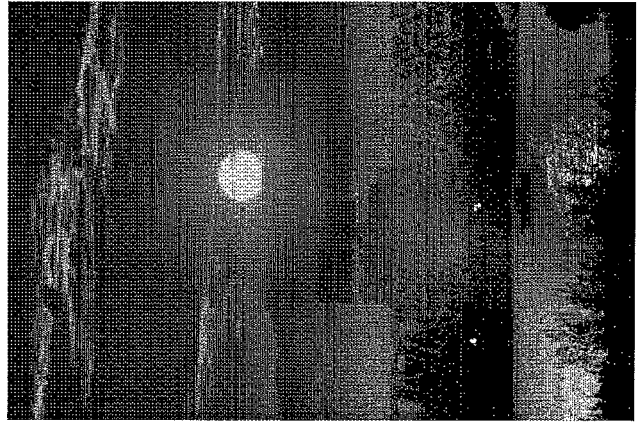

FIGS. 8(a) and 9(a) illustrate examples of input images of the image processing apparatus 20 according to the present invention. Due to insufficient luminance adjustment, with the exception of the setting suns in the background, the input images are dark and hardly distinguishable. FIGS. 8(b) and 9(b) illustrate, as comparative examples, output images obtained by performing histogram equalization processing on the input images. While the sun is brightly highlighted as though daytime, in the vicinity of the sun, contours are blurred as a result of being dragged by the luminance of the sun.

FIGS. 8(c) and 9(c) illustrate output images obtained by performing adaptive contrast filtering according to the present invention on the input images. Output images are obtained in which contrasts are appropriately adjusted and all contours are vividly displayed.

Due to the ability of the present invention of enhancing contours even when an input image has various contrasts, expectations are high for the application of the present invention to the medical field such as diagnostic imaging for extracting a specific mass or the like as well as fields such as security and safety devices for extracting a specific person or the like. Therefore, the industrial applicability of the present invention is extremely high.

What is claimed is:

1. An image processing method for adjusting a luminance value of each pixel included in an input image, the image processing method comprising the steps of:
    (S4) demarcating a closed region β(x, y) made up of a plurality of pixels in the input image as a closed target region, repeatedly moving the closed target region within the input image by a predetermined number of pixel units to respectively calculate a maximum value ($e_{max}$) and a minimum value ($e_{min}$) of luminance energy defined as a luminance arrangement in the closed target region based on the maximal luminance energy value and the minimal luminance energy value of each and every one of the closed target region and its moved versions, and calculating a difference data ($e_{diff}$) of the luminance energy each time the closed target region is moved, where $e_{diff} = e_{max} - e_{min}$;
    (S5) applying a linear transform, based on a linear function, to a luminance value of each coordinate based on the difference data $e_{diff}$, wherein applying a linear transform includes steps (S5-1)-(S5-4) as follows:
        (S5-1) for an arbitrarily defined pixel, a width of 0 to $e_{min}$ and a width of $e_{max}$ to $I_2$ are compared, whereby a value of whichever width is smaller is denoted by L such that $L = \min(I_2 - e_{max}, e_{min})$;
        (S5-2) if $e'_{max} = e_{max} + L$, $e'_{min} = e_{min} - L$, and $e'_{diff} = e'_{max} - e'_{min}$, a luminance value P(i,j) on a shifted pixel is linearly transformed such that $e_{min}$ to $e_{max}$ are transformed to $e'_{min}$ to $e'_{max}$, and the transformed value is denoted by p'(i, j);
        (S5-3) applying steps (S5-1) and (S5-2) to all the pixels; and
        (S5-4) obtaining a maximum value and a minimum value of the transformed values and performing a, linear transform such that the maximum value and the minimum value fall within a range in accordance with Expression A, $$p'_{(i,j)} = e'_{diff} \times (p_{(i,j)} - e_{min}) / e_{diff} \qquad \text{(Expression A)}.$$

2. The image processing method according to claim 1, further comprising, before step (S5), an initializing process for the image processing method, the initializing process comprising the step of:
    (S1) calculating a mean luminance value ($I_0$) of the entire input image, and adding a luminance value ($I_2/2 - I_0$) of a specific amount determined based on the mean luminance value ($I_0$) and a maximum luminance value ($I_2$) of a possible range to a luminance distribution of the input image.

3. The image processing method according to claim 1, comprising, before the step (S4) for calculating the difference data, the steps of:
    (S2) obtaining, with respect to the input image, coordinate data relating to a portion in the target region having a maximum difference in luminance values between a central pixel ($I_{0,0}$) and an arbitrarily defined pixel ($I_{i,j}$) in the region and a computed value reflecting a magnitude relation of the difference in luminance values in accordance with Expression B;

$$\min \sum_{j=-r}^{r} (I_{i,j} - I_{0,0})^2, \; i = 0, \ldots, 3 \qquad \text{(Expression B)}$$

and
    (S3) calculating a degree of luminance concentration of a pixel for each coordinate in accordance with Expression C $$[\text{Degree of luminance concentration of pixel}] = \qquad \text{(Expression C)}$$
$$\left( \min \sum_{j=-r}^{r} (I_{i,j} - I_{0,0})^2 \right) \times I_{0,0}, \; i = 0, \ldots, 3$$

such that the degree of luminance is calculated by computing a product of the computed value and a luminance value in the input image and, for a luminance value at a coordinate whose degree of luminance concentration equals or exceeds a threshold set in advance, the separately calculated computed value is replaced by a mean luminance value to complement the luminance value.

4. An image processing method for adjusting a luminance value of each pixel included in an input image, the image processing method comprising the steps of:
- (S1) calculating, with respect to the input image, a mean luminance value ($I_0$) of the entire input image, and adding a luminance value ($I_2/2-I_0$) of a specific amount determined based on the mean luminance value ($I_0$) and a maximum luminance value of a possible range ($I_2$) to a luminance distribution of the input image;
- (S2) demarcating a closed region β(x, y) made up of a plurality of pixels in an input image as a target region, and moving the target region within the input image by predetermined pixel units to obtain coordinate data relating to a characteristic portion having a large difference in luminance values included in the input image and a computed value reflecting a magnitude relation of the difference in luminance values by calculating Expression B $$\min \sum_{j=-r}^{r} (I_{i,j} - I_{0,0})^2, i = 0, \ldots, 3;$$ (Expression B)

- (S3) calculating a degree of luminance concentration of a pixel for each coordinate in accordance with Expression C

[Degree of luminance concentration of pixel] = (Expression C)

$$\left( \min \sum_{j=-r}^{r} (I_{i,j} - I_{0,0})^2 \right) \times I_{0,0}, i = 0, \ldots, 3$$

such that the degree of luminance is calculated by computing a product of the computed value and a luminance value in the input image and, for a luminance value at a coordinate whose degree of luminance concentration equals or exceeds a threshold set in advance, the separately calculated computed value is replaced by a mean luminance value to complement the luminance value;
- (S4) calculating, with respect to luminance values at coordinates other than the coordinate where the luminance value had been complemented, a maximum value and a minimum value of luminance energy defined as a luminance arrangement in the target region for each coordinate based on the maximal luminance energy value and the minimal luminance energy value of each and every one of the target region and its moved versions, and calculating difference data of the luminance energy;
- (S5) linearly transforming, after step S1, a luminance value of each coordinate based on the difference data; and
- (S6) adapting the linearly transformed luminance value to each pixel included in the input image by outputting the luminance value after step (S5) in order to generate an output image.

5. A computer program on non-transitory computer-readable medium for causing a computer to execute the respective steps according to any one of claims 1 to 4.

* * * * *